FREQUENCY TRANSLATION PROCESS AND APPARATUS THEREFOR

Filed March 8, 1968 2 Sheets-Sheet 1

INVENTOR

RUSSELL S. NORRIS, JR.

BY Brady, O'Boyle & Gates

ATTORNEYS

March 10, 1970 R. S. NORRIS, JR 3,500,399

FREQUENCY TRANSLATION PROCESS AND APPARATUS THEREFOR

Filed March 8, 1968 2 Sheets-Sheet 2

United States Patent Office 3,500,399
Patented Mar. 10, 1970

3,500,399

FREQUENCY TRANSLATION PROCESS AND APPARATUS THEREFOR

Russell Snyder Norris, Jr., State College, Pa., assignor to HRB-Singer, Inc., State College, Pa., a corporation of Delaware Filed Mar. 8, 1968, Ser. No. 715,474
Int. Cl. G01s 9/42
U.S. Cl. 343—7.7 12 Claims

ABSTRACT OF THE DISCLOSURE

A "Phasadyne" modulation process and apparatus for electrical signals which combines the principles of the Autodyne and Homodyne circuits for providing frequency translation by means of a bilateral phase modulator which operates to cumulatively effect a 0–360° phase shift of a signal during each modulation period by causing a 0–180° phase shift of the signal which is propagated successively in both directions through the modulator during the same modulation period.

BACKGROUND OF THE INVENTION

Frequency translation can be defined as a modulation process which operates upon an input signal having a frequency $F_0$ in such a manner as to produce an output signal having a frequency of either $F_0+f_1$ or $F_0-f_1$. The frequency of the input signal has either been increased or decreased thereby by an amount $f_1$. The ideal or perfect frequency translator accomplishes its objective without any loss of power in the process, and also without generating any undesired frequency components. For example, if the desired output is a signal having a frequency of $F_0+f_1$, then any output signal having frequencies of $F_0$ or $F_0-f_1$ would be considered as undesired output frequencies.

The process of frequency translation or frequency shifting is in effect a single-sideband, suppressed-carrier modulation process wherein two signals having frequencies of $F_0$ and $f_1$, where $F_0$ is greater than $f_1$, are applied to the input of a modulation device and from which an output signal is provided having a single frequency equal to either $F_0+f_1$ or $F_0-f_1$. The subject of single sideband modulation has been extensively considered in the "Single Sideband Issue" of the Proceedings of the IRE, volume 44, No. 12, December 1956. Frequency conversion which occurs as a result of a phase variation is also taught by an article entitled "Frequency Conversion by Phase Variation," published in Phillips Research Reports, volume 4, June 1949, pages 161–167, by G. Diemer and K. S. Knol.

The general principles of frequency translation by means of a linear phase modulating waveform is disclosed in an article appearing in the IRE Wescon Convention Record, 1957, volume 1, part 1, pages 201–207, entitled "Frequency Translation by Phase Modulation," by E. M. Rutz and J. E. Dye. Their analysis indicates that a linear phase deviation of 360 electrical degrees ($2\pi$ radians) during the period $T_1$ of the modulating waveform results in ideal frequency translation of the input signal having a frequency $F_0$ to a frequency $F_0+f_1$ when the phase of the input signal is increased and to a frequency $F_0-f_1$ when the phase of the input signal is decreased. Furthermore, frequency translation by means of a linear sawtooth waveform applied to a semiconductor device is taught in U.S. Patent No. 2,701,302, which issued Feb. 1, 1956 to L. J. Giacolleto.

SUMMARY OF THE INVENTION

Briefly, the subject invention is directed to a process and apparatus for producing frequency translation of a signal linearly phase modulated during a predetermined modulation period with a phase deviation of 360°. The process comprises the steps of: feeding an input signal having a frequency of $F_0$ from a carrier signal source to a bilateral phase modulator device, applying a modulation signal having a frequency $f_1$ to the bilateral phase modulator and shifting the phase of the input signal from 0–180 electrical degrees during the period $T_1$ of the modulation signal where $T_1=1/f_1$, feeding the signal shifted in phase from the phase modulator back through the phase modulator during the same modulation period, whereupon the signal undergoes a second linear phase shift of from 0–180 electrical degrees thereby providing a total linear phase deviation of the signal fed from the source of operation of from zero to 360 electrical degrees during the modulation period $T_1$. As a result of the two-part linear phase modulation process which produces a total linear phase deviation of 0–360 electrical degrees during the modulation period $T_1$, the output signal will be equivalent to a signal having a frequency of $F_0+f_1$ or $F_0-f_1$, depending upon whether the action of the modulation signal causes the phase of the applied signal $F_0$ to be advanced or retarded, respectively. The signal is propagated in the bilateral phase modulator in opposite directions, each time undergoing a 0–180° electrical phase shift during the period $T_1$. The output signal has been effectively translated in frequency thereby from a frequency $F_0$ to either $F_0+f_1$ or $F_0-f_1$ depending upon the mode of operation.

DESCRIPTION OF THE PREFERRED EMBODIMENTS

Figure 1:
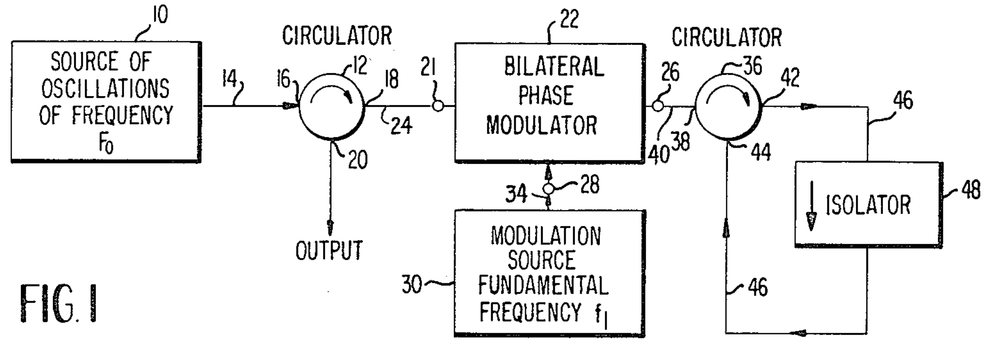
FIGURE 1 is a block diagram of the basic embodiment of the subject invention.

Referring now to the drawings, FIGURE 1 discloses a signal source 10 providing an output comprising a signal having a frequency $F_0$. This signal is fed to circulator device 12 by suitable circuit means 14. A circulator is a multi-port device either active or passive, having a preferred direction of signal transfer between ports. The signal transfer path in the direction opposite to the preferred direction is highly attenuated so as to provide negligible signal transfer therebetween. The circulator 12 comprises a three-port circulator including ports 16, 18 and 20. The preferred direction of signal transfer is indicated by the arrow and is defined as follows: a signal applied to port 16 will be transferred with relatively little attentuation to port 18 and exits as an output therefrom. A signal applied to port 18 on the other hand is transferred to port 20. This defines the preferred direction of signal flow in the circulator. Under the same conditions of operation, a signal applied to port 16 does not transfer to port 20 due to extremely high attenuation path provided nor does a signal applied to port 18 transfer to port 16. Likewise, a signal applied to port 20 does not transfer a signal to port 18.

Accordingly, a signal having a frequency of $F_0$ from the signal source 10 is fed to the port 16 where it appears as an output at port 18. This signal is then fed to terminal 21 of a bilateral phase modulator 22 by means of suitable circuit means 24. The bilateral phase modulator 22 may be of any desired type of presently-known phase modulators which exhibit the property that a signal applied to either of two terminals 21 and 26 appear at the opposite terminal having undergone the process of phase modulation upon the application of a modulation signal applied thereto by means of terminal 28. An example of such a modulator apparatus which exhibits bilateral characteristic is disclosed in FIG. 3 of U.S. Patent 3,155,965, issued Nov. 3, 1964 to J. D. Harmer, for "Feed-Through Nulling System." Other known types of apparatus and circuitry are also adaptable for utilization in the present circuit as bilateral phase modulators such as the modulators disclosed in U.S. Patents 3,153,206 and 3,210,692 issued Oct. 13, 1964 and Oct. 5, 1965, respectively, both of which are comprised of elements which are non-directional in operation, that is reciprocal signal translation elements. In the instant embodiment, a modulation source 30 providing a modulation signal comprising substantially a sawtooth waveform having a frequency $f_1$ is applied to terminal 28 of the bilateral phase modulator 22 by means of suitable circuit means 34. The sawtooth waveform from the modulation source 30 produces a substantially linear, repetitive phase deviation of substantially 0–180 electrical degrees during the period $T_1$ of the modulation signal where $T_1=1/f_1$. This is illustrated by waveform A of FIGURE 2 and is indicative of the fact that a signal having a frequency of $F_0$ which is applied to terminal 21 appears at terminal 26 having undergone a linear, repetitive phase deviation of 0–180 electrical degrees during each modulation period $T_1$.

The phase modulated signal present at terminal 26 of the bilateral phase modulator is next fed to a second multi-port circulator 36 at port 38 by means of circuit means 40. Circulator 36 includes three ports 38, 42 and 44. The signal applied to port 38 is transferred to port 42 where it is then coupled back to port 44 by means of suitable electrical circuitry 46 which may include an isolator 48 when desirable. The signal fed back to port 44 of circulator 36 is transferred to port 38 and circuit means 40. However, the signal is traveling or propagating in the opposite direction back toward terminal 28 of the bilateral phase modulator 22. The signal is applied as an input terminal 26 and undergoes a second, linear phase modulation process of substantially 0–180 electrical degrees during the same modulation period $T_1$. It appears at terminal 21 of the bilateral phase modulator 22, having undergone a total linear phase modulation of 0–360 electrical degrees during the modulation period $T_1$. Although an inherent time delay occurs between the time the signal is applied to terminal 21 and returns thereto in the opposite direction, it is negligible in comparison to the length of the modulation period $T_1$. Two signals exist then substantially simultaneously at terminal 21 of the bilateral phase modulator 22; however, they are traveling or propagating in opposite directions. The signal having a frequency $F_0$ travels in a direction from port 18 of circulator 12 toward terminal 21 while the phase modulated signal travels in a direction from terminal 21 toward port 18 of the circulator 12. The latter signal will then be transferred to port 20, providing the final output.

As a result of the two-part, linear phase modulation process which produces a total linear phase deviation of substantially 0–360 electrical degrees during the modulation period $T_1$, the signal that appears at terminal 21 of the bilateral phase modulator 22 traveling or propagating in a direction toward port 18 of the circulator 12 will be equivalent to a signal having a frequency of $F_0+f_1$ or signal having a frequency $F_0-f_1$, depending upon whether the action of the sawtooth waveform from the modualtion source 30 causes the phase of the applied signal $F_0$ from the signal source 10 to be advanced or retarded.

Figures 2, 3:
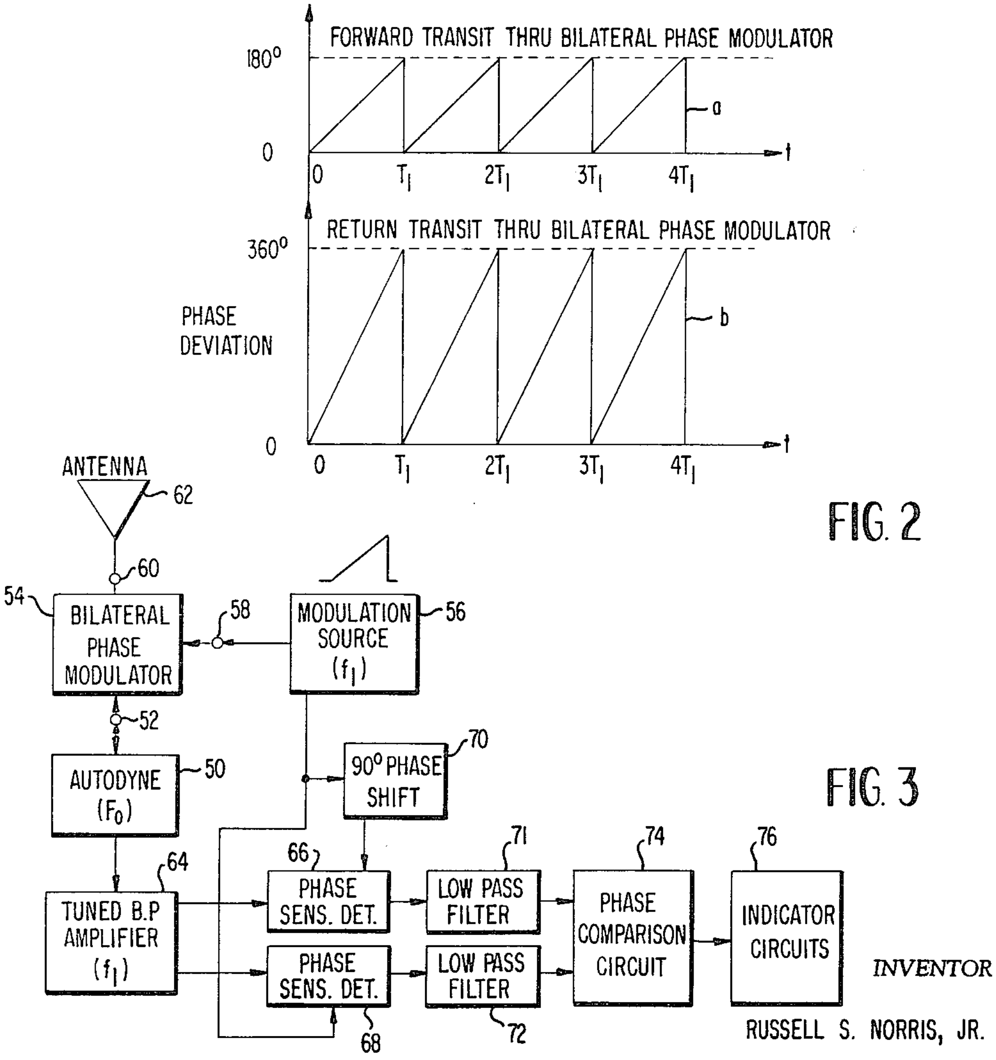
FIGURE 2 is a diagram of illustrative waveforms helpful in understanding the operation of the embodiment shown in FIGURE 1.
FIGURE 3 is a block diagram of a second embodiment of the subject invention adapted to provide a doppler intrusion sensor system.

Referring now to FIGURE 2, waveform B is illustrative of the travel of the signal back through the bilateral phase modulator 22 from terminal 26 to terminal 21 and is indicative of the fact that the overall phase deviation during each modulation period $T_1$ is from 0–360 degrees, varying linearly between these two limits.

The use of the bilateral phase modulator 22 in the instant invention for the frequency translation process provides a distinct advantage over the presently-used methods and apparatus for obtaining frequency translation due to the fact that the phase deviation limits required are only between 0 and 180 electrical degrees rather than 0 and 360 electrical degrees. This permits the use of electronically variable phasing elements, such as semiconductor voltage variable capacitance diodes, referred to as varactors, which exhibit a relatively smaller dynamic range. Further the problem of proper shaping of the modulation waveform is simplified and the required amplitude of the modulation waveform is correspondingly reduced. It is well known that the most efficient frequency translation is achieved when a uniformly linear phase modulation process is effected. Whenever discrete step function phase variations are used to simulate the linear phase modulation, the efficiency of frequency translation decreases and the amplitude level of undesired spectral sidebands increases.

Frequency translation by means of the instant invention therefore provides a successful implementation of a frequency translator employing semiconductor voltage variable capacitance diodes.

An embodiment of the subject invention into a low power coherent Doppler radar system for providing improved detection sensitivity and sense of motion discrimination for a Doppler intrusion sensor system is shown in FIGURE 3. This embodiment includes an autodyne circuit 50 which is a self-oscillating detector which provides both the transmitter power having a frequency $F_0$, local oscillator signal and mixer action. The autodyne circuit is well known to those skilled in the art. Such circuitry, for example, has been utilized in VT fuse systems and is taught in the proceedings of the IRE, December 1946, pages 976–986, "Radio Proximity Fuse Development," by W. Hinman and C. Brunetti. A microwave signal having a frequency $F_0$ is coupled from the autodyne 50 to terminal 52 of a bilateral phase modulator 54. A substantially sawtoothed or ramp waveform having a frequency $f_1$ is coupled from the modulation source 56 to terminal 58 of the bilateral phase modulator which during one period $T_1$ of the sawtooth waveform causes the bilateral phase modulator 54 to produce a lineear change in phase of the signal applied to terminal 52 from 0–180 electrical deirees. The phase varied signal appears at terminal 60 of the bilateral phase modulator 54 and is coupled to the microwave antenna 62 and radiated into the surrounding space. For purposes of illustration, a single target, not shown, is assumed to be present in the detection range and moving uniformly relative to the system shown in FIGURE 3. This single target will reflect a small fraction of the incident microwave power transmitted from the antenna 62 and due to the movement will introduce a Doppler shift in the frequency $F_0$. This phenomenon is well known to those skilled in the art and need not be elaborated. The sign of the Doppler shift + or − will be determined by the sense of motion of the target relative to the antenna 62. If the target is approaching the antenna 62, the apparent received microwave frequency will be increased from its transmitted frequency $F_0$; while if the target is receding from the antenna 62, the apparent received microwave frequency will be decreased from the transmitted frequency $F_0$. For a relatively slow moving target, the percentage shift in frequency due to the Doppler effect will be relatively small.

The relatively low microwave return signal which is sensed by the antenna 62 is coupled back to terminal 60 of the bilateral phase modulator 54 wherein it undergoes a second linear phase modulation operation as described with respect to the embodiment in FIGURE 1. For a target located a relatively short distance from the antenna 62, the round-trip travel time or time delay is very small making the phase delay due to the round trip negligible and therefore will not significantly degrade the phase modulation process. In passing through the bilateral phase modulator 54 the second time, the resulting microwave signal applied to terminal 60 will appear to have been operated by two distinct frequency translation processes: the first being the effect of the frequency translation process and secondly by the Doppler effect caused by the moving target. The microwave signal emerging from the bilateral phase modulator 54 at terminal 52 and propagating toward the oscillator-detector or autodyne 50, now has a frequency content of $F_0+f_1\pm f_d$ where $F_0$ is the original microwave signal frequency produced by the autodyne 50, $f_1$ is the fundamental frequency of the modulation waveform from the modulation source 56 and $f_d$ represents the frequency shift due to the Doppler effect of the moving target. The + and − sign preceding $f_d$ indicates the sense of motion of the moving target. The frequency translated signal appearing at terminal 52 is fed back to the autodyne 50 where it is coherently mixed with a sample of the original frequency $F_0$ to produce both sum and difference frequencies by means of the heterodyne process. The difference frequency will be at a frequency of $f_1\pm f_d$ while retaining the sense of motion information (+ or −). The difference frequency is coupled from the autodyne 50 to a bandpass amplifier 64 which is tuned to reject all other signals except the difference frequency $f_1\pm f_d$. The amplified difference frequency is simultaneously applied to two synchronous detectors 66 and 68 which are phase sensitive. A reference signal for the detectors 66 and 68 is coupled from the modulation source 56. A signal having a frequency $f_1$ is directly coupled to the synchronous detector 68; however, the signal which is applied to synchronous detector 66 is shifted 90 degrees in phase by means of phase shifter 70. The phase sensitive detectors 66 and 68 accordingly operate in phase quadrature and the sign of the Doppler shift frequency $f_d$ can be determined thereby. This effect has been described in the Proceedings of the IRE, volume 43, No. 6, June 1955, pages 689–700, "Direction-Sensitive Doppler Device," by H. P. Kalmus. When the Doppler shift is positive, indicative of an approaching target, one of the two signal channels thus provided by the phase sensitive detectors 66 and 68, will lead the other channel by 90 electrical degrees. When the Doppler shift is negative, the signal in the same channel will then lag the other signal by 90 electrical degrees.

By applying the outputs of the phase sensitive detectors 66 and 68, respectively, to low pass filters 71 and 72 and feeding their outputs to a phase comparison circuit 74, a useful output signal is provided which when coupled to an indicator circuit 76 provides an indication of targets having uniform motion relative to the antenna 62.

Such a system is particularly adapted to provide a free space detection range of at least 100 feet for a typical human target and characteristically operates at a very low radiation power level to minimize undesired countermeasures.

Figure 4:
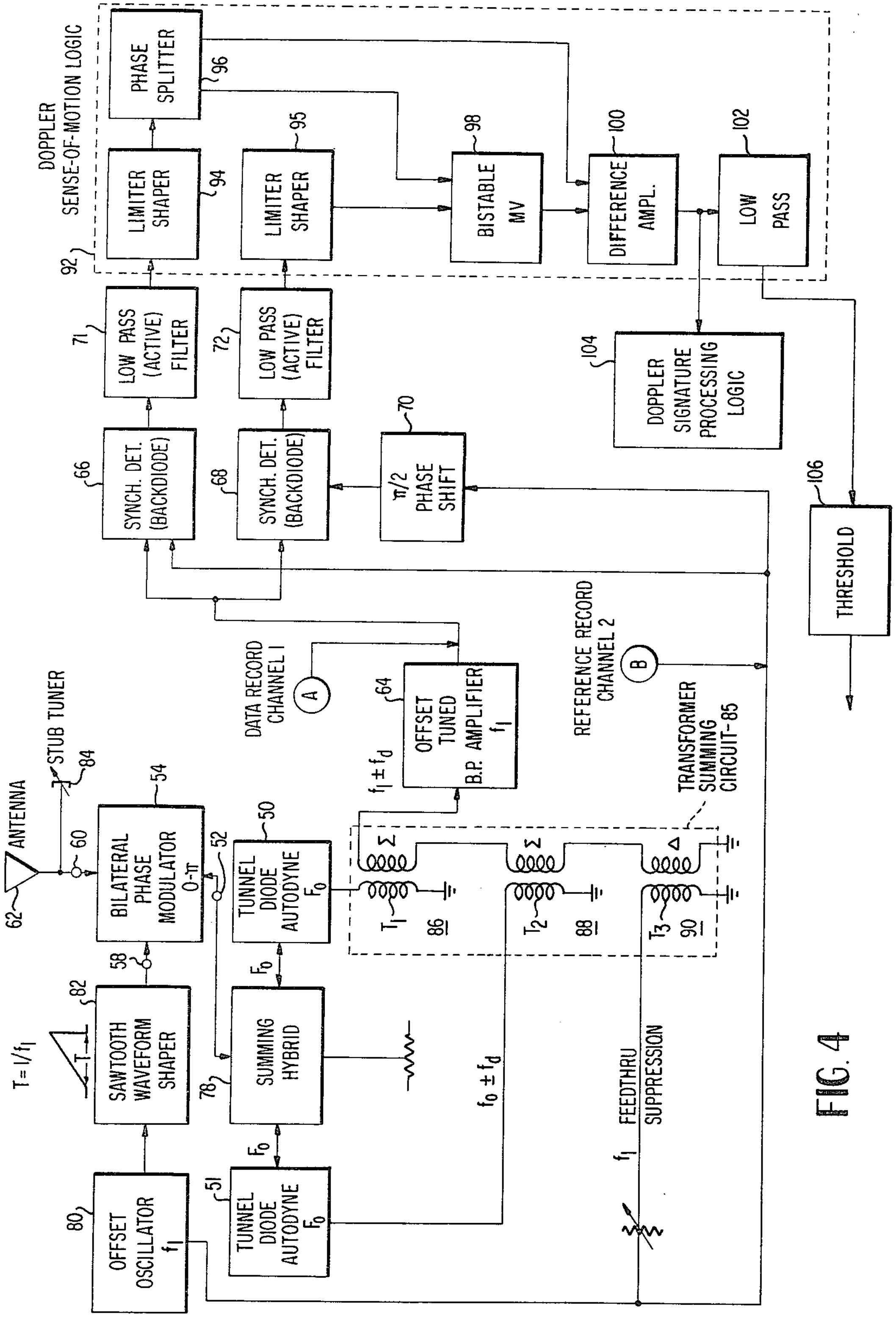
FIGURE 4 is a block diagram illustrative of another doppler intrusion sensor system similar to the embodiment shown in FIGURE 3.

Another embodiment of the subject invention is shown in FIGURE 4 and comprises a system similar to the embodiment shown in FIGURE 3 in that the present embodiment also discloses a Doppler system for detecting uniformly moving targets. The configuration shown in FIGURE 4 utilizes two tunnel diode autodyne circuits 50 and 51, both generating a microwave carrier frequency of $F_0$. The carrier frequency outputs of both autodynes 50 and 51 are coupled into a summing hybrid network 78 the output of which is fed to terminal 52 of the bilateral phase modulator 54. A sawtooth modulation signal having a period of $T_1$ is coupled to terminal 58 by means of a sawtooth waveform shaper circuit 82 coupled to a sinewave oscillator 80. The microwave signal having a frequency $F_0$ is phase modulated during the period $T_1$ between 0 and 180 electrical degrees and appears at terminal 60 where it is radiated into free space by means of the antenna 62. A stub tuner 84 is coupled between the bilateral phase modulator 54 and antenna 62 for impedance match purposes. The target signal is returned to the antenna 62 and passes through the phase modulator 54 in the opposite direction. After passing through the phase modulator, the second time as previously described, the emerging signal at terminal 52 which is propagated toward the summing hybrid 78 is at a frequency of $$F_0+f_1\pm f_d$$

The target return signal is divided into two substantially equal amplitude, in-phase signals by the hybrid 78. These two signals are now coupled back to the autodynes 50 and 51 where they are mixed with the respective carrier signals having identical frequencies of $F_0$ to produce two respective output signals both having a frequency of $f_1\pm f_d$. The respective output signals from the autodynes 50 and 51 are coupled to transformers 86 and 88, respectively, where they are linearly summed by means of their secondary windings which are coupled in series. Transmission feed-through of the carrier signal which is an undesirable characteristic of all CW radar systems is overcome by coupling a portion of the sinewave oscillator 80 output to the transformer 90 which has its secondary winding also coupled in series to the secondaries of transformers 86 and 88; however, its polarity is such that it will cancel the carrier feed-through signals appearing at transformers 86 and 88. The signal emerging from the transformers 86 through 90 has a frequency equal to $f_1\pm f_d$ and is coupled into the bandpass amplifier 64 which rejects unwanted signals while amplifying the signal comprising frequency $f_1\pm f_d$. The amplifier 64 output is coupled simultaneously to the synchronous phase detectors comprising synchronous detectors 66 and 68 coupled to the sinewave oscillator 80. As has been noted previously in order to derive the Doppler information one of the reference signals must be shifted by 90 degrees so that the detectors 66 and 68 operate in phase quadrature. This is provided by the phase shifter circuit 70 coupled between the oscillator 80 and the phase sensitive detector 68. The output of the phase sensitive detector 66 is coupled to the lowpass filter 71 while the output phase sensitive detector 68 is coupled to the lowpass filter 72. The operation of the synchronous detectors 66 and 68 is identical to that described with respect to the embodiment shown in FIGURE 3. The lowpass filters 71 and 72 are comprised of matched active RC lowpass filters and are respectively coupled into the Doppler sense of motion logic circuitry 92 which is comprised of a pair of limiter-shaper circuits 94 and 95. Additionally included in the logic circuit 92 is phase splitter 96 coupled to the limiter 94, a bistable multivibrator 98 receiving inputs from the limiter 95 and the phase splitter 96, a difference amplifier receiving the output from the bistable multivibrator 98 and one of the outputs from the phase splitter 96 and a lowpass filter 102. The output of the difference amplifier 100 is fed into a Doppler processing logic circuit 104 and has for its purpose the identification of the type of target being detected. The output of the lowpass filter 102 is coupled into a threshold detector circuit 106 which has for its purpose the coupling of targets of predetermined signal strength to an indicator circuit, not shown, so that background clutter and other undesirable noise is eliminated.

What has been shown and described therefore is a method and means providing frequency translations by means of a device which provides a phase shift of substantially 0–180 degrees but in effect has provided a phase shift of 0–360 degrees during a modulation period. Additionally, a low-power Doppler radar system is described utilizing the principles and apparatus as taught by the subject invention for mechanizing a system which is particularly adapted to sensing the presence of an intruder such as a human being at short range.

It is not desired therefore that the invention be limited to the specific embodiments shown but it is to be understood that all equivalents, modifications and alterations thereto are herein meant to be included.

What is claimed is:

1. The method of translating the frequency of an electrical signal from a frequency $F_0$ to a frequency $F_0+f_1$ or $F_0-f_1$ comprising the steps: Generating a first signal having a frequency $F_0$, feeding said first signal into a bilateral phase modulator circuit, generating a substantially linear waveform signal having a frequency of $f_1$ and thus defining a period $T_1$, applying said linear waveform to a modulator circuit for effecting a substantially 0–180 degrees phase shift of said first signal during said period $T_1$, and feeding said first signal back through the bilateral phase modulator in the opposite direction for effecting a second phase shift of said first signal of substantially 0–180 degrees during said period $T_1$ thereby effectively varying the phase of said first signal between 0–360 degrees during said period $T_1$.

2. The method as defined in claim 1 wherein said linear waveform signal comprises a sawtooth or ramp waveform.

3. Apparatus for providing frequency translation of an electrical signal comprising in combination: a signal source providing a carrier signal having a frequency $F_0$; a bilateral phase modulator circuit; first circuit means coupled between said signal source and said bilateral phase modulator for feeding said carrier signal thereto; a second source of electrical signals, providing a substantially linear waveform signal and having a frequency $f_1$, coupled to said bilateral phase modulator for effecting a phase modulation of substantially 0–180 electrical degrees during a modulation period $T_1$ wherein $T_1=1/f_1$, said bilateral phase modulator providing an output signal comprising a phase shifted carrier signal in accordance with said phase modulation; and second circuit means coupled to said bilateral phase modulator for feeding said output signal back through said bilateral phase modulator in the opposite direction for effecting a second phase modulation of substantially 0–180 electrical degrees during said period $T_1$ providing another output signal comprising a further phase shifted carried signal in accordance with said second phase modulation.

4. Apparatus for providing frequency translation of an electrical signal comprising in combination: a signal source providing a carrier signal having a frequency $F_0$; a bilateral phase modulator circuit having two carrier signal terminals and a modulation signal terminal; first circuit means coupling said carrier signal to one carrier signal terminal of said bilateral phase modulator from said signal source; a second source of signals, generating a substantially linear waveform signal and having a frequency $f_1$ coupled to the modulation signal terminal of said bilateral phase modulator for effecting a phase modulation of substantially 0–180 electrical degrees by means of said linear waveform signal during the period $T_1$, wherein $T_1=1/f_1$, said bilateral phase modulator providing a phase shifted carrier signal at the other carrier signal terminal, said carrier signal being shifted according to the linear waveform applied to said bilateral phase modulator; second circuit means for feeding the phase shifted carrier signal back to said other carrier signal terminal of the bilateral phase modulator for propagating said phase shifted carrier signal back through said bilateral phase modulator during said period $T_1$ for providing a second phase shift of substantially 0–180 electrical degrees to provide a signal at said one carrier signal terminal of a signal which is effectively shifted in phase substantially 0–360 degrees during said period $T_1$.

5. The apparatus as defined by claim 4 wherein said first and said second circuit means comprises multi-port circulator devices.

6. The invention as defined by claim 4 wherein said second signal source comprises an oscillator providing a sawtooth or ramp waveform having a frequency $f_1$.

7. The invention as defined by claim 4 wherein said first and second circuit means comprises a first and a second multi-port circulator device and additionally including an isolator device coupled between adjacent ports of said second multi-port device in the preferred signal flow direction.

8. The invention as defined by claim 4 wherein said source of carrier signals comprises an autodyne circuit.

9. The invention as defined by claim 8, and additionally including synchronous detector means coupled to said autodyne circuit for providing an output signal which is indicative of a sense of motion.

10. The invention as defined by claim 9 wherein said synchronous detector means comprises a first and a second phase sensitive detector coupled to said autodyne circuits including means for coupling a signal from said modulation source directly to one of said phase sensitive detectors and additionally including a 90 degree phase shifter circuit coupling a signal from said modulation source to said second phase sensitive detector.

11. The invention as defined by claim 4 wherein said source of carrier signals comprises a first and a second autodyne circuit, and additionally including hybrid means coupling said first and said second autodyne circuits to said bilateral phase modulator.

12. The invention as defined by claim 11 and additionally including a transformer summing circuit coupled to said first and said second autodyne circuit, said summing circuit including at least a first and a second transformer respectively coupled to said autodyne circuits and including circuit means for coupling the secondary windings thereof in series.

References Cited

UNITED STATES PATENTS

| | | | |
|---|---|---|---|
| 2,991,467 | 7/1961 | Clarke | 343—8 X |
| 3,378,637 | 4/1968 | Kawai et al. | 325—137 X |

ROONEY D. BENNETT, Jr., Primary Examiner

H. C. WAMSLEY, Assistant Examiner

U.S. Cl. X.R.

325—19, 145; 332—16; 343—8